United States Patent [19]

Usui

[11] Patent Number: 4,690,829
[45] Date of Patent: Sep. 1, 1987

[54] METHOD OF PREVENTING RETROGRADATION OF FOODSTUFFS

[75] Inventor: Takayuki Usui, Kanazawa, Japan

[73] Assignee: Mitsui & Co., Ltd., Tokyo, Japan

[21] Appl. No.: 704,315

[22] PCT Filed: Jun. 15, 1984

[86] PCT No.: PCT/JP84/00314
§ 371 Date: Feb. 4, 1985
§ 102(e) Date: Feb. 4, 1985

[87] PCT Pub. No.: WO85/00004
PCT Pub. Date: Jan. 3, 1985

[30] Foreign Application Priority Data

Jun. 16, 1983 [JP] Japan ............................ 58-108242

[51] Int. Cl.$^4$ ............................................ A21D 2/08
[52] U.S. Cl. ...... 426/661; 426/653; 426/321; 426/89; 426/549; 426/19; 426/96
[58] Field of Search ............... 426/653, 549, 557, 661, 426/658, 578, 579, 321, 89, 19, 96

[56] References Cited

U.S. PATENT DOCUMENTS 2,431,512 11/1947 Schopmeyer ...................... 426/579
2,653,876 9/1953 Hanson et al. ..................... 426/579
4,116,770 9/1978 Goering et al. ....................... 127/32

FOREIGN PATENT DOCUMENTS 53-160376 6/1980 Japan .
4437332 6/1980 Japan .
4723380 6/1980 Japan .

OTHER PUBLICATIONS

Ghiasi et al., Cereal Chemistry 1984, vol. 61, No. 4, pp. 281-284.
Yoon et al. J. of the Korean Agricultural Chemical Society 1984, vol. 27, No. 29, p. 79, (abstract only).
Hoseney et al., The Bakers Digest, vol. 52, No. 8, pp. 11-16,40.
Schultz et al., 1969 Symposium on Foods: Carbohydrates and Their Roles. AVI Publishing Co., Westport Conn., pp. 395-397.
Kent-Jones et al., 1957 Modern Cereal Chemistry 5th ed Northern Publishing Co., Ltd. Liverpool England p. 16.
Anon 1976 Corn Starch, Corn Refiners Assoc., Inc., Washington DC., pp. 19-20.
Tressler et al., 1957 The Freezing Preservation of Foods, vol. II, AVI Publishing Co., Inc., Westport, Conn, p. 338.
Starch Handbook by J. Nikuni, published May 15, 1975 by Asakura Publishing, Japan.

*Primary Examiner*—Raymond N. Jones
*Assistant Examiner*—Carolyn Paden
*Attorney, Agent, or Firm*—Oblon, Fisher, Spivak, McClelland, & Maier

[57] ABSTRACT

This invention relates to a method of preventing the retrogradation of foodstuffs containing starchy material, wherein waxy barley starch is used as part of the starchy material. Optionally, a polysaccharide is added to the starchy material.

1 Claim, No Drawings

METHOD OF PREVENTING RETROGRADATION OF FOODSTUFFS

FIELD OF THE INVENTION

The present invention relates to a method of preventing the retrogradation of foodstuffs containing starchy material.

Prior Art

In such foodstuffs containing starchy material as rice cake, bean-jam buns, noodles, bread, and sponge cakes, a phenomenon called retrogradation occurs after a lapse of time subsequent to their production. When retrogradation occurs, foodstuffs generally harden, their texture becomes poor, and their digestibility also becomes poor.

Accordingly, the product value of such foodstuffs declines appreciably as a result of retrogradation. The cause of retrogradation is generally considered to lie mainly in the fact that starch becomes $\beta$ starch. Conventionally, various methods have been adopted to prevent the retrogradation of foodstuffs. For instance, there is known a method of adding such hydrophilic substances as sugar, sorbitol, and dextrin. With this method, however, it has not been possible to obtain sufficient effect, and if the usage is incorrect, such substances can adversely promote retrogradation. In addition, a surface active agent is used to prevent the retrogradation of bread, but it is not very effective, either. Furthermore, in the cases of rice cake, bean-jam buns and the like, a method to prevent retrogradation has been attempted in which starch is gradually decomposed during the period of storage with the addition to amylase. When the decomposition of starch progresses excessively, the texture becomes poor, and at the same time, it is difficult to handle amylase since heating stops its activity.

OBJECT OF THE INVENTION

Accordingly, an object of the invention is to provide a more effective method of preventing the retrogradation of foodstuffs.

DESCRIPTION OF THE INVENTION

As a result of conducting intensive research to attain the aforementioned objective, the inventors discovered that it is possible to prevent the retrogradation of foodstuffs quite effectively by using waxy barley starch as part of the starchy material, thereby completing this invention.

In other words, according to a first aspect of this invention, there is provided a method of preventing the retrogradation of foodstuffs, wherein waxy barley starch is used as part of the starchy material.

In addition, according to a second aspect of this invention, there is provided a method of preventing the retrogradation of foodstuffs, wherein waxy barley starch is used as part of the starchy material, and, furthermore, a polysaccharide is added thereto.

Heretofore, waxy barley has been known only in China, Korea, and Japan. Recently, however, it has become possible to grow waxy barley on a commercial scale through the efforts of such researchers as Robert F. Eslick of the University of Montana in the United States. Waxy barley starch produced from this barley is characterized by high viscous behavior of its high-concentration slurry and high enzymatic digestibility.

In rice cake, bean-jam buns and the like, waxy corn starch is also used widely in addition to glutinous rice flour. According to the experiments conducted by the inventors, however, it was found that retrogradation of such foodstuffs of glutinous rice with waxy corn starch is adversely accelerated as compared with that of the foodstuffs of glutinous rice without waxy corn starch.

The reason why retrogradation can be prevented only in cases where waxy barley starch, among waxy starches, is used is not understood well, but it is considered that this is an effect of the molecular structure inherent in waxy barley starch. In addition, it is also conceivable that it is affected in some way or other by the amylase contained in barley.

In this invention, although only waxy barley starch isolated from waxy barley may be used, waxy barley flour may be used as it is, because it contains a great amount of starch, say 55 to 57 percent by weight. If waxy barley flour is used, the amount of waxy barley starch is preferably selected within the range of 2 to 50 wt.% vis-a-vis the starch material. If the amount is below 2 wt.%, it is not possible to obtain a sufficient retrogradation preventing effect, and if it exceeds 50 wt.%, the taste tends to become poor.

Additionally, as well as waxy barley starch or flour, it is also possible to use various kinds of starchy materials that have been conventionally used in the production of foodstuffs, such as rice, glutinous rice, rice flour, wheat flour, corn starch, and potato starch.

Furthermore, according to the invention, the addition of a polysaccharide results in a further improvement in the effect of preventing retrogradation as well as an improvement in the texture. As such a polysaccharide, it is possible to employ, for instance, olygosaccharide, dextrin, carrageenin, pectin, locust bean gum, guar gum, tamarind gum, and xanthan gum. In particular, however, it is preferable to employ Daiei Shokuhin Kogyo KK-made Defroster #1001 and #1002 (tradenames: hereinafter called DF-#1001 and DF-#1002), which contain various polysaccharides as a retrogradation preventing agent. The volume of the polysaccharide to be added is preferably selected from the range of 0.5 to 15 wt.% vis-à-vis starchy material. If the volume is below 0.5 wt.%, the effect of the addition is small, and if it exceeds 15 wt.%, the taste of products is affected.

EFFECTS OF THE INVENTION

This invention can be applied to various types of foodstuffs based on starch material. For instance, it can be applied to such Japanese cakes as rice cake, dumplings, and bean-jam buns, such noodles as wheat vermicelli, buckwheat vermicelli, and uncooked Chinese vermicelli, and cakes including bread, sponge cakes, and the like. Hence, it is possible to prevent the retrogradation of these foodstuffs and to maintain their softness, elasticity, texture, digestibility, etc. under favorable conditions.

(Example 1)

Mitarashi dango (dumplings coated with sauce or the like and served on a stick) were produced using a conventional method according to the following receipe:

| Sample 1 | | Sample 2 | |
|---|---|---|---|
| Nonglutinous rice flour | 2 kg | Nonglutinous rice flour | 1400 g |
| | | Waxy barley flour | 600 g |

| Sample 1 | | Sample 2 | |
|---|---|---|---|
| Hot water | 1.1 l | Hot water | 1.1 l |

When an organoleptic test was conducted for this mitarashi dango, after leaving it as it was at room temperature (5°–10° C.), Sample 1, a conventional product, hardened in two days, whereas in the case of Sample 2, according to this invention, it was possible to maintain softness for 20 days. Furthermore, when 60 g of aforementioned DF-#1001 was added to Sample 2, it was able to maintain softness for 30 days.

(Example 2)

Bean-jam buns were produced using a conventional method according to the following recipe:

| Sample 3 | | Sample 4 | |
|---|---|---|---|
| Soft wheat flour | 400 g | Soft wheat flour | 360 g |
| | | Waxy barley flour | 40 g |
| Sucrose | 100 g | Sucrose | 100 g |
| Water | 150 cc | Water | 150 cc |
| Baking powder | 8 g | Baking powder | 8 g |

When an organoleptic test was conducted for these bean-jam buns, after leaving them as they were at room temperature, Sample 3, a conventional product, hardened in two days, whereas in the case of Sample 4, according to this invention, it was possible to maintain softness for 15 days. Furthermore, when 6 g of the aforementioned DF-#1001 was added to Sample 4, it was possible to maintain softness for 20 days.

(Example 3)

Shells of cream puffs were produced using a conventional method according to the following recipe:

| Sample 5 | | Sample 6 | |
|---|---|---|---|
| Hard wheat flour | 150 g | Hard wheat flour | 147 g |
| | | Waxy barley flour | 3 g |
| Butter | 93 g | Butter | 93 g |
| Water | 180 cc | Water | 180 cc |
| Egg | 6 pc | Egg | 6 pc |

When an organoleptic test was conducted for these shells for cream puffs, after leaving them as they were at room temperature, Sample 5, a conventional product, hardened in three days, whereas in the case of Sample 6, according to this invention, it was possible to maintain softness for seven days. Furthermore, when 3 g of the aforementioned DF-#1002 was added to Sample 6, it was possible to maintain softness for 10 days.

(Example 4)

The coating of rice cakes stuffed with bean jam was produced using a conventional method according to the following recipe:

| Sample 7 | | Sample 8 | |
|---|---|---|---|
| Glutinous rice flour | 1 kg | Glutinous rice flour | 1 kg |
| | | Waxy corn starch | 300 g |
| Water | 700 cc | Water | 700 cc |
| Sample 9 | | Sample 10 | |
| Waxy corn starch | 500 g | Glutinous rice flour | 900 g |
| Waxy barley flour | 500 g | Waxy barley flour | 100 g |
| Water | 700 cc | Water | 700 cc |

When an organoleptic test was conducted for this coating of rice cakes stuffed with bean jam, after leaving it as it was at room temperature, Sample 7, a conventional product, hardened in three days, and Sample 8 in one day, whereas in the case of Sample 9, according to this invention, it was possible to maintain softnesss for seven days, and in the case of Sample 10, for 15 days. Furthermore, when 20 g of aforementioned DF-#1001 was added to Sample 10, it was possible to maintain softness for 20 days.

(Example 5)

The coating of unbaked cinnamon-seasoned cracknels was produced using a conventional method according to the following recipe:

| Sample 11 | | Sample 12 | |
|---|---|---|---|
| Refined rice flour | 50 g | Refined rice flour | 50 g |
| Water | 300 cc | Water | 300 cc |
| Unglutinous rice flour | 50 g | Unglutinous rice flour | 50 g |
| Soft wheat flour | 300 g | Soft wheat flour | 210 g |
| | | Waxy barley flour | 90 g |
| Sucrose | 400 g | Sucrose | 400 g |
| Thick malt syrup | 250 g | Thick malt syrup | 250 g |
| Cinnamon | 30 g | Cinnamon | 30 g |

When an organoleptic test was conducted for this coating of unbaked cinnamon-seasoned cracknels, after leaving it as it was at room temperature, Sample 11, a conventional product, hardened in three days, whereas in the case of Sample 12, according to this invention, it was possible to maintain softness for 15 days. Furthermore, when 40 g of the aforementioned DF-#1002 was added to Sample 12, it was possible to maintain softness for 25 days.

(Example 6)

Wheat vermicelli was produced using a conventional method according to the following recipe:

| Sample 13 | | Sample 14 | |
|---|---|---|---|
| Soft Wheat flour | 2.5 kg | Soft Wheat flour | 1.75 kg |
| | | Waxy barley flour | 0.75 kg |
| Salt | 30 g | Salt | 30 g |
| Water | 1 l | Water | 1 l |

When an organoleptic test was conducted for this wheat vermicelli, after leaving it as it was at room temperature, in Sample 13, a conventional product, a phenomenon of retrogradation appeared in three days, whereas in the case of Sample 14, according to this invention, it was possible to maintain softness for 15 dys. Furthermore, when 375 g of the aforementioned DF-#1002 was added to Sample 14, it was possible to prevent retrogradation for 25 days. In addition, elongation occurring after boiling was eliminated, and crumbling due to boiling did not occur even after it was boiled for an extended period of time.

(Example 7)

Tempura flour was produced using a conventional method according to the recipe described below. This was used as the coating for shrimps, and after quick-freezing and storing the coated shrimps at −25° C. for six months, the coated shrimps were fried in deep fat and the texture was measured. Sample 15, a conventional product, deteriorated in taste, whereas Sample 16 according to this invention showed practically no change as compared to the pre-frozen state.

| Sample 15 | | Sample 16 | |
|---|---|---|---|
| Whole egg | 1 pc | Whole egg | 1 pc |
| Water | 150 cc | Water | 150 cc |
| Soft wheat flour | 100 g | Soft wheat flour | 70 g |
| | | Waxy barley flour | 30 g |

(Example 8)

Roll sponge cakes were produced using a conventional method according to the following recipe:

| Sample 17 | | Sample 18 | |
|---|---|---|---|
| Whole egg | 325 g | Whole egg | 325 g |
| Sucrose | 175 g | Sucrose | 175 g |
| Glucose | 38 g | Glucose | 38 g |
| Soft wheat flour | 125 g | Soft wheat flour | 115 g |
| | | Waxy barley flour | 10 g |
| Butter | 38 g | Butter | 38 g |
| Rum | 23 cc | Rum | 23 cc |
| Water | 23 cc | Water | 23 cc |

When an organoleptic test was conducted for these roll sponge cakes, after leaving them as they were at room temperature, Sample 17, a conventional product, hardened and became crumbly in 12 days, whereas in the case of Sample 18, according to this invention, it was possible to maintain softness and elasticity for 25 days. Furthermore, when 0.625 g of the aforementioned DF-#1001 was added to Sample 18, it was possible to maintain softness and elsaticity for 30 days.

(Example 9)

Rice cakes for wrapping in an oak leaf were produced using a conventional method according to the following recipe:

| Sample 19 | | Sample 20 | |
|---|---|---|---|
| Unglutinous rice flour | 4 kg | Unglutinous rice flour | 2.8 kg |
| | | Waxy barley flour | 1.2 kg |
| Hot water | 2.2 l | Hot water | 2.2 l |
| Salt | 6 g | Salt | 6 g |
| Dogtooth violet starch | 200 g | Dogtooth violet starch | 200 g |

When an organoleptic test was conducted for these rice cakes for wrapping in an oak leaf, after leaving them as they were at room temperature, Sample 19, a conventional product, hardened in two days, whereas in the case of Sample 20, according to this invention, it was possible to maintain softness for 12 days. Furthermore, when 200 g of the aforementioned DF-#1002 was added to Sample 20, it was possible to maintain softness for 20 days.

(Example 10)

Sponge cakes were produced using a conventional method according to the following recipe:

| Sample 21 | | Sample 22 | |
|---|---|---|---|
| Sucrose | 1,000 g | Sucrose | 1,000 g |
| Whole egg (with shell) | 2,000 g | Whole egg (with shell) | 2,000 g |
| Soft wheat flour | 1,000 g | Soft wheat flour | 950 g |
| | | Waxy barley flour | 50 g |
| Butter | 500 g | Butter | 500 g |

When an organoleptic test was conducted for these sponge cakes, after leaving them as they were at room temperature, Sample 21, a conventional product, hardened in five days, whereas in the case of Sample 22, according to this invention, it was possible to maintain softness and elasticity for 10 days. Furthermore, when 5 g of the aforementioned DF-#1001 was added to Sample 22, it was possible to maintain softness and elasticity for 15 days.

(Example 11)

Fruit cakes were produced using a conventional method according to the following recipe:

| Sample 23 | | Sample 24 | |
|---|---|---|---|
| Butter | 1,000 g | Butter | 1,000 g |
| Sucrose | 1,000 g | Sucrose | 1,000 g |
| Whole egg (with shell) | 1,000 g | Whole egg (with shell) | 1,000 g |
| Soft wheat flour | 1,000 g | Soft wheat flour | 900 g |
| | | Waxy barley flour | 100 g |
| Baking powder | 15 g | Baking powder | 15 g |
| Fruit seasoned with rum | 700 g | Fruit seasoned with rum | 700 g |

When an organoleptic test was conducted for these fruit cakes, after leaving them as they were at room temperature, Sample 23, a conventional product, hardened and became crumbly in four days, whereas in the case of Sample 24, according to this invention, it was possible to maintain softness and elasticity for 10 days. Furthermore, when 5 g of the aforementioned DF-#1001 was added to Sample 24, it was possible to maintain softness and elasticity for 13 days.

(Example 12)

Butter rolls were produced using a conventional method according to the following recipe:

| Sample 25 | | Sample 26 | |
|---|---|---|---|
| Hard wheat flour | 1,000 g | Hard wheat flour | 980 g |
| | | Waxy barley flour | 20 g |
| Sucrose | 100 g | Sucrose | 100 g |
| Salt | 15 g | Salt | 15 g |
| Whole egg | 100 g | Whole egg | 100 g |
| Butter | 100 g | Butter | 100 g |
| Condensed milk | 90 cc | Condensed milk | 90 cc |
| Water | 360 cc | Water | 360 cc |
| Yeast | 20 g | Yeast | 20 g |

When an organoleptic test was conducted for these butter rolls, after leaving them as they were at room temperature, Sample 25, a conventional product, hardened and became crumbly in three days, whereas in the case of Sample 26, according to this invention, it was possible to maintain softness and elasticity for six days. Furthermore, when 5 g of the aforementioned DF-#1001 was added to Sample 26, it was possible to maintain softness and elasticity for eight days.

(Example 13)

Crepes were produced using a conventional method according to the following recipe:

| Sample 27 | | Sample 28 | |
|---|---|---|---|
| Milk | 250 cc | Milk | 250 cc |
| Hard wheat flour | 75 g | Hard wheat flour | 71.25 g |
| | | Waxy barley flour | 3.75 g |
| Sucrose | 30 g | Sucrose | 30 g |
| Whole egg | 2 pc | Whole egg | 2 pc |
| Vanilla essence | trace | Vanilla essence | trace |
| Brandy | trace | Brandy | trace |

When an organoleptic test was conducted for these crepes, after leaving them as they were at room temperature, Sample 27, a conventional product, hardened and became crumbly in 10 days, whereas in the case of Sample 28, according to this invention, it was possible to maintain softness and elasticity for 20 days. Furthermore, when 0.375 g of the aforementioned DF-#1001 was added to Sample 28, it was possible to maintain softness and elasticity for 25 days.

What is claimed is:

1. A method of preventing the retrogradation of foodstuffs containing starchy material, wherein waxy barley starch or waxy barley flour having an amount of waxy barley starch within the range of 2 to 50 wt.% of the starchy material, is used as part of said starchy material, and, wherein at least one polysaccharide selected from the group consisting of an oligosaccharide, dextrin, carrageenin, pectin, locust bean gum, guar gum, tamarind tum and xanthane gum is added thereto, wherein the amount of the polysaccharide to be added is within the range of 0.5 to 15 wt.% of the starchy material.

* * * * *